T. B. GARRETSON.
DISH DRAINER.
APPLICATION FILED APR. 12, 1909.
934,721.　　　　　　　　　　　　　Patented Sept. 21, 1909.
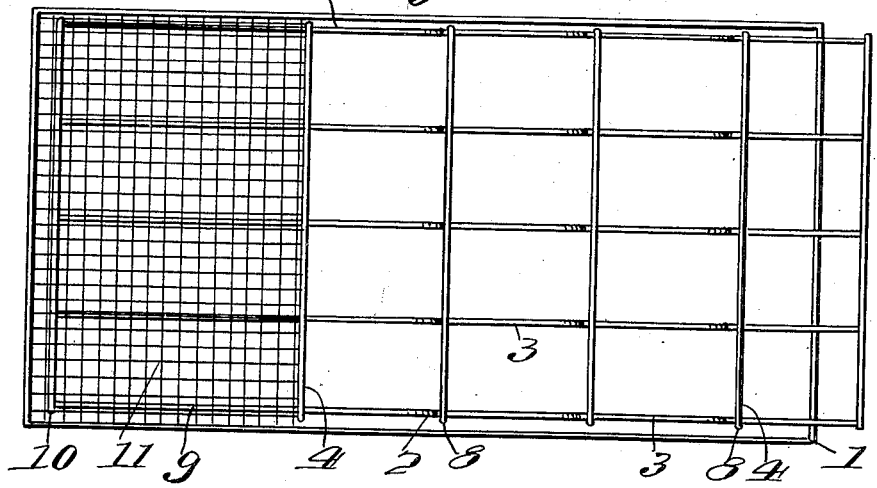
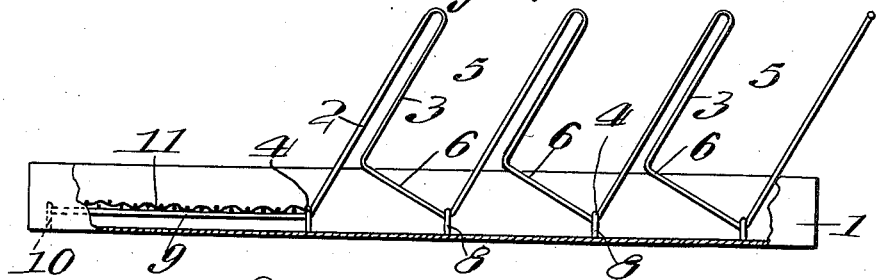
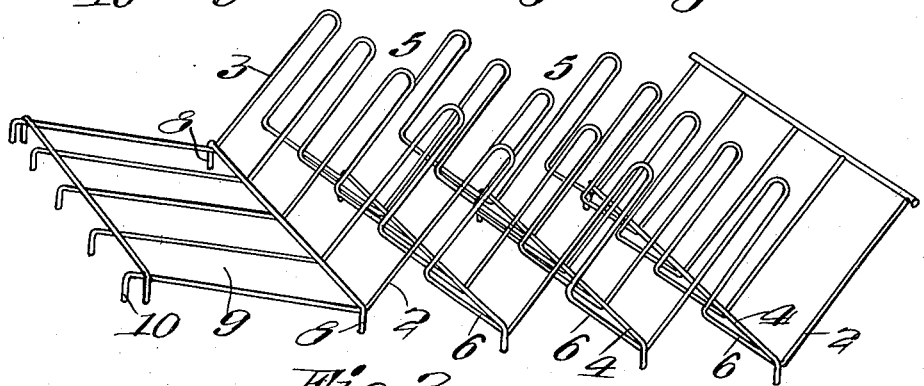
Witnesses　　　　　　　　　　Inventor
　　　　　　　　　　　　　　Thomas B. Garretson,
　　　　　　　　　　　　by
　　　　　　　　　　　　　　　　Attorneys

UNITED STATES PATENT OFFICE.

THOMAS B. GARRETSON, OF OSKALOOSA, IOWA.

DISH-DRAINER.

934,721.   Specification of Letters Patent.   Patented Sept. 21, 1909.

Application filed April 12, 1909. Serial No. 489,340.

*To all whom it may concern:*

Be it known that I, THOMAS B. GARRETSON, a citizen of the United States, residing at Oskaloosa, in the county of Mahaska and State of Iowa, have invented certain new and useful Improvements in Dish-Drainers; and I do declare the following to be a full, clear, and exact description of the invention, such as will enable others skilled in the art to which it appertains to make and use the same.

This invention relates to a dish drainer and contemplates the production of a simple and inexpensive device of this character comprising a rack in which the dishes may be placed in the desired position for rinsing and draining and a drain pan having an outlet to collect or receive the drip water from the dishes.

With this and other objects in view, the invention consists of certain novel features of construction, combination and arrangement of parts, as will be more fully described and particularly pointed out in the appended claim.

In the accompanying drawings, Figure 1 is a plan view of a device embodying my improvements; Fig. 2 is a side elevation thereof with a portion of one side of the drip pan broken away; Fig. 3 is a detail perspective view of the dish rack.

Referring to the drawings for a more particular description of the invention the device comprises a drip pan, 1, of preferably rectangular form in which is placed the dish rack, 2. This rack is preferably formed of the longitudinal and transverse tie wires, 3 and 4, respectively, the former of which are bent to form the rectangular dish compartments, 5, having upwardly inclined bottoms, 6, and the inclined sides, 7. The tie wires, 4, extend across the longitudinal wires at the lower edges of the bottoms of the dish compartments and are provided at opposite ends with downwardly projecting extensions, 8, which provide a means for supporting the bottom of the rack a suitable distance, say one inch, above the bottom of the casing. The rack is also provided at one end with the longitudinal horizontal extension, 9, the outer edge of which is supported above the pan by the downwardly bent portions, 10, of the wires, 3. A wire netting cover, 11, having a mesh of suitable size is arranged on the extension, 9, to prevent knives, spoons, forks or the like which may be placed on the extension, 9, from slipping or falling between the spaces between the longitudinal wires, 3, forming said extension.

In using the device the dishes are placed in the respective compartments of the rack in the most desirable or convenient manner. For instance, the plates may be placed in one compartment, the cups in another compartment, the saucers in another compartment and so on. The water is then poured over the dishes and owing to the angular position of the compartments it is obvious that the dishes will receive the full benefit of the water.

Having thus described my invention what I claim is:

In a device of the class described, a series of longitudinally disposed rods each having a horizontal portion and a series of inclined extensions, a series of inclined connecting members between the extensions, tie bars rigidly fastened to said rods at like points in the latter, whereby a plurality of angularly disposed compartments are formed, downwardly projecting extensions on the tie bars serving as supports for the device, and a cover piece of wire netting arranged over said horizontal portions.

In testimony whereof I have hereunto set my hand in presence of two subscribing witnesses.

THOMAS B. GARRETSON.

Witnesses:
C. D. ALEXANDER,
R. E. REDMAN.